United States Patent
Abrishamain et al.

(10) Patent No.: US 8,972,273 B1
(45) Date of Patent: Mar. 3, 2015

(54) METHOD AND SYSTEM FOR PROVIDING INFORMATION TO MARKET PARTICIPANTS ABOUT ONE OR MORE POWER GENERATING UNITS BASED ON THERMAL IMAGE DATA

(71) Applicant: Genscape Intangible Holding, Inc., Louisville, KY (US)

(72) Inventors: Ramin Abrishamain, Needham, MA (US); Gustav H. Beerel, Lincoln, MA (US)

(73) Assignee: Genscape Intangible Holding, Inc., Louisville, KY (US)

(*) Notice: Subject to any disclaimer, the term of this patent is extended or adjusted under 35 U.S.C. 154(b) by 0 days.

(21) Appl. No.: 13/934,950

(22) Filed: Jul. 3, 2013

Related U.S. Application Data

(63) Continuation of application No. 13/269,833, filed on Oct. 10, 2011, now abandoned, which is a continuation of application No. 12/053,139, filed on Mar. 21, 2008, now abandoned.

(60) Provisional application No. 60/919,316, filed on Mar. 21, 2007.

(51) Int. Cl.
  *G06Q 10/00* (2012.01)
  *G06K 9/00* (2006.01)

(52) U.S. Cl.
  CPC .................................. *G06K 9/00624* (2013.01)
  USPC ........................................................ 705/7.11

(58) Field of Classification Search
  USPC ........................................................ 705/7.11
  See application file for complete search history.

(56) References Cited

U.S. PATENT DOCUMENTS

2005/0276510 A1* 12/2005 Bosco et al. .................. 382/275
2009/0216574 A1*  8/2009 Nuszen et al. ..................... 705/7

* cited by examiner

*Primary Examiner* — Allen J Jung
(74) *Attorney, Agent, or Firm* — Stites & Harbison, PLLC; David W. Nagle, Jr.

(57) ABSTRACT

A method for providing information to a market participant about a power generating unit based on thermal image data comprises the steps of: acquiring thermal data from a smokestack of a power generating unit; recording one or more images of the acquired thermal data; transmitting the recorded images to a central processing facility; analyzing the recorded images to determine the operational status of the power generating unit; and communicating information about the operational status of the power generating unit to the market participant.

4 Claims, 4 Drawing Sheets

$$m = 1, 2, \ldots, M$$
$$n = 1, 2, \ldots, N$$
$$\rho_{mn} \equiv \text{pixel area density}$$
$$A_{mn} = \ell^2 \equiv \text{pixel area}$$
$$w_{mn} = \rho_{mn} A_{mn} \equiv \text{pixel intensity}$$

METHOD AND SYSTEM FOR PROVIDING INFORMATION TO MARKET PARTICIPANTS ABOUT ONE OR MORE POWER GENERATING UNITS BASED ON THERMAL IMAGE DATA

CROSS-REFERENCE TO RELATED APPLICATIONS

The present application is a continuation of U.S. patent application Ser. No. 13/269,833 filed on Oct. 10, 2011, which is a continuation of U.S. patent application Ser. No. 12/053,139 filed on Mar. 21, 2008, which claims priority to U.S. Provisional Patent Application Ser. No. 60/919,316 filed on Mar. 21, 2007. The entire disclosure of U.S. Provisional Patent Application Ser. No. 60/919,316 is incorporated herein by reference.

BACKGROUND OF THE INVENTION

The present invention relates to a method and system for providing information to market participants about one or more power generating units based on thermal image data.

In analyzing a regional electricity grid and forecasting wholesale electricity prices in the near-term markets, one key consideration is the status of electricity supply. In order to monitor the status of electricity supply, one known method is to place one or more monitoring devices at selected locations near high-voltage electric power transmission lines to allow for a determination of the amount and direction of electric power flowing over a particular set of transmission lines. For example, and as described in U.S. Pat. Nos. 6,714,000; 6,771,058; 6,956,364; and 7,088,090, this is accomplished through the use of sensing elements responsive to the electric potential and the magnetic flux densities associated with the transmission lines, therefore allowing for periodic or continuous measurements of the electric potential and magnetic flux densities associated with the transmission lines. Collected data is then transmitted to a central processing facility where a computational analysis is conducted to calculate the amount and direction of both real and reactive electric power flowing on the monitored set of transmission lines. The resulting power data can be further analyzed and compiled to determine the output of a power plant connected to the transmission lines. This information can then be used to assess regional electricity supply and forecast wholesale electricity prices.

However, some power plants, including those which may be critical for an accurate analysis and understanding of the supply situation in a given geographic region may not use overhead transmission lines. Rather, in some cases, transmission lines may travel underground and, as such, it is effectively impossible to use sensing elements responsive to the electric potential and the magnetic flux densities associated with the transmission lines in order to derive information about the output of the power plant.

Furthermore, most power plants include a number of independent power generating units, and monitoring the transmission lines exiting the power plant does not give an accurate indication of which power generating units are on and which are off. This can also limit the accuracy of an assessment of the electricity supply being contributed by a particular power plant.

SUMMARY OF THE INVENTION

The present invention is a method and system for providing information to market participants about one or more power generating units based on thermal image data, a method and system that allows for an accurate assessment of the operational status of a particular power plant, including an identification of which power generating units are on and which are off.

An exemplary system in accordance with the present invention generally includes four components: (1) a monitor component for acquiring thermal data from a smokestack and/or the gas plume emitted from the smokestack of a power plant; (2) a video capture component for recording images of the acquired thermal data; (3) a data transmission component for transmitting the recorded images to a central processing facility; and (4) an analysis component for analyzing the recorded images and, using one or more databases storing information regarding the nature and capability of that power plant, drawing an inference as to the operational status of that power plant. Using such a system, the resultant information can then be used to assess regional electricity supply and forecast wholesale electricity prices.

The monitor component (or monitor) is preferably comprised of a commercially-available device, such as a thermal imaging camera, scanner, detector, etc., that is coupled to a lens or other optical arrangement with an adequate focal length to focus on a smokestack and/or the gas plume emitted from a smokestack of a power plant that is being monitored. The monitor is installed at a selected location and is focused on one or more smokestacks of the power plant to be monitored. The monitor acquires thermal data by detecting and identifying areas of a smokestack and/or the gas plume emitted from a smokestack which are hotter than the ambient temperature of the air surrounding the smokestack.

The video capture component is used to record images of the acquired thermal data. In one exemplary embodiment, the video capture component includes a central processing unit (CPU), which receives acquired thermal data from the monitor through a graphics or video capture board. The acquired thermal data is stored in memory associated with the CPU either in individual image files or in video files. A digital computer program associated with the CPU manages: (i) the transfer of the acquired thermal data from the monitor to the CPU; (ii) the recording and storage of the acquired thermal data in memory associated with the CPU as individual image files or in video files; and (iii) the transmission of the recorded images to a central processing facility, as further described below.

The data transmission component is connected to the CPU and provides for the transmission of the recorded images to the central processing facility, for example, through an Internet connection or other known data transmission means.

At the central processing facility, the analysis component analyzes the recorded images and, using one or more databases storing information regarding the nature and capability of the monitored power plant, draws an inference as to the operational status of that power plant.

Finally, information about the operational status of one or more power generating units and/or power plants is communicated to third parties, i.e., market participants. To the extent that the recorded images can be transmitted to the central processing facility in substantially real-time, information can then be communicated to market participants in substantially real-time.

DETAILED DESCRIPTION OF THE INVENTION

The present invention is a method and system for providing information to market participants about one or more power generating units based on thermal image data, a method and system that allows for an accurate assessment of the operational status of a particular power plant, including an identification of which power generating units are on and which are off.

Figure 1:
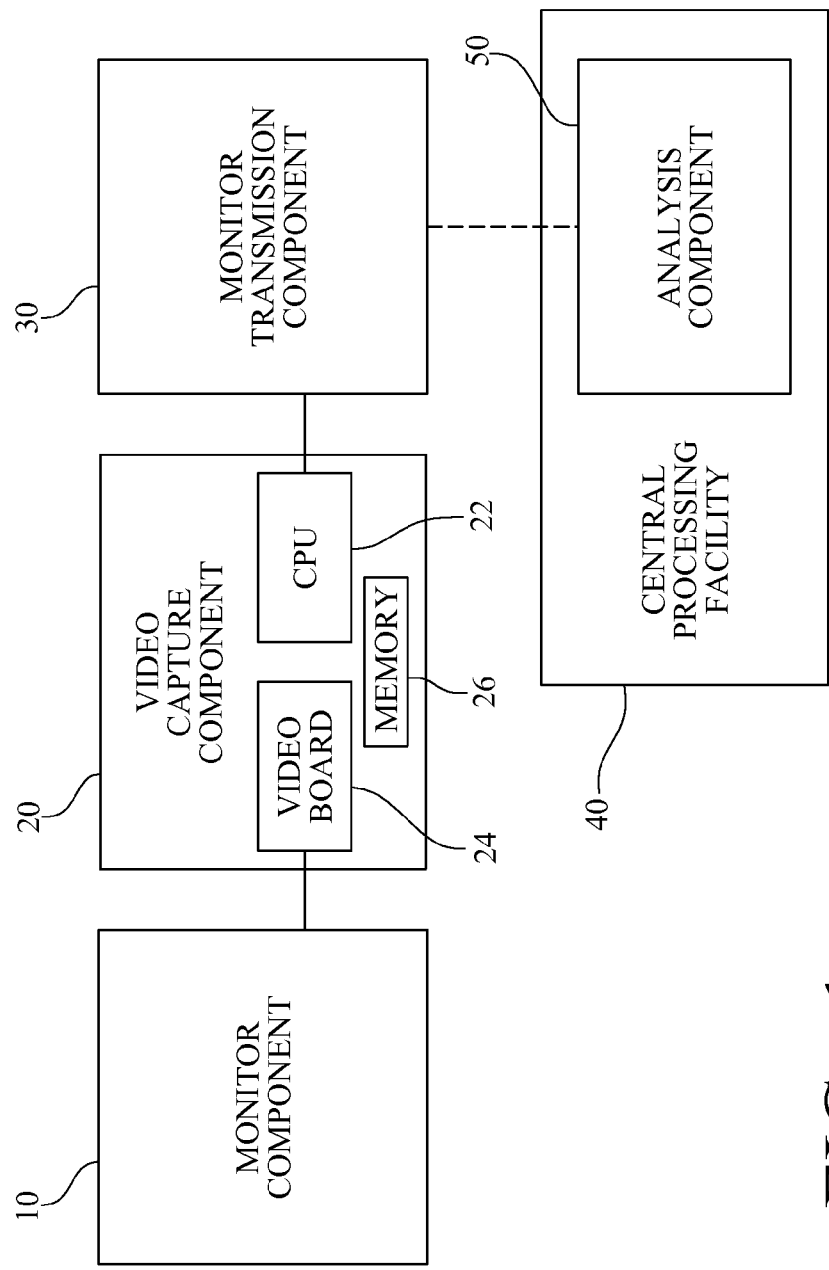
FIG. 1 is a schematic view of an exemplary system in accordance with the present invention.

Referring now to FIG. 1, an exemplary system in accordance with the present invention generally includes four components: (1) a monitor component 10 for acquiring thermal data from a smokestack and/or the gas plume emitted from the smokestack of a power plant; (2) a video capture component 20 for recording images of the acquired thermal data; (3) a data transmission component 30 for transmitting the recorded images to a central processing facility 40; and (4) an analysis component 50 for analyzing the recorded images and, using one or more databases storing information regarding the nature and capability of that power plant, drawing an inference as to the operational status of that power plant. Using such a system, the resultant information can then be used to assess regional electricity supply and forecast wholesale electricity prices.

The monitor component 10 is preferably comprised of a commercially-available device, such as a thermal imaging camera, scanner, detector, etc., that is coupled to a lens or other optical arrangement with an adequate focal length to focus on a smokestack and/or the gas plume emitted from a smokestack of a power plant that is being monitored. In the present application, the monitor component 10 may also sometimes be referred to as the "monitor." Also, with respect to the term "smokestack," in the present application, this term is used in a generic sense and is intended to include other stacks associated with power plants, such as vent stacks or effluent stacks.

The monitor 10 is installed at a selected location (e.g., within approximately one mile of the power plant) and is focused on one or more smokestacks of the power plant to be monitored. The monitor 10 is preferably housed in a weatherproof enclosure so as to protect it against the weather and other elements (e.g., vandalism), but such an enclosure could take various forms without departing from the spirit and scope of the present invention. The monitor 10 acquires thermal data by detecting and identifying areas of a smokestack and/or the gas plume emitted from a smokestack which are hotter than the ambient temperature of the air surrounding the smokestack. With respect to the gas plume itself, the emitted gases are a by-product from the boilers utilized in the power plant and, in the case of a power plant fueled by hydrocarbons (i.e., coal, gas, oil, etc.), these emitted gases consist almost entirely of carbon dioxide and water vapor. Thus, the smokestack associated with an operational power generating unit will produce a different thermal "signature" as compared than a smokestack associated with a nonoperational power generating unit.

The video capture component 20 is used to record images of the acquired thermal data. In one exemplary embodiment, and as shown in FIG. 1, the video capture component 20 includes a central processing unit (CPU) 22, which receives acquired thermal data from the monitor 10. The CPU 22 can be a personal computer, a microprocessor, a specialized printed circuit board, or other similar device. The CPU 22 is operably connected to a graphics or video capture board 24, for example, a PCI-1405 image acquisition board manufactured and distributed by National Instruments Corporation of Austin, Tex. The acquired thermal data is stored in memory 26 associated with the CPU 22 either in individual image files or in video files. A digital computer program associated with the CPU manages: (i) the transfer of the acquired thermal data from the monitor 10 to the CPU 22; (ii) the recording and storage of the acquired thermal data in memory 26 associated with the CPU 22 as individual image files or in video files; and (iii) the transmission of the recorded images to a central processing facility 40, as further described below. Such a computer program can be any of a number of commercially available software packages; for example, one appropriate "off-the-shelf" software package is LabVIEW, which is also marketed and distributed by National Instruments Corporation of Austin, Tex.

The data transmission component 30 is connected to the CPU 22 and provides for the transmission of the recorded images to the central processing facility 40. The data transmission component 30 may facilitate such data transmission through an Internet connection or other known data transmission means without departing from the spirit and scope of the present invention.

As mentioned above, the monitor 10 is preferably housed in a weatherproof enclosure so as to protect it against the weather and other elements (e.g., vandalism), and it is contemplated that the video capture component 20 and the data transmission component 30 could also be stored in this same weatherproof enclosure.

At the central processing facility 40, the analysis component 50 analyzes the recorded images and, using one or more databases storing information regarding the nature and capability of the monitored power plant, draws an inference as to the operational status of that power plant. Such analysis is further described below with respect to FIG. 2.

Figure 2:
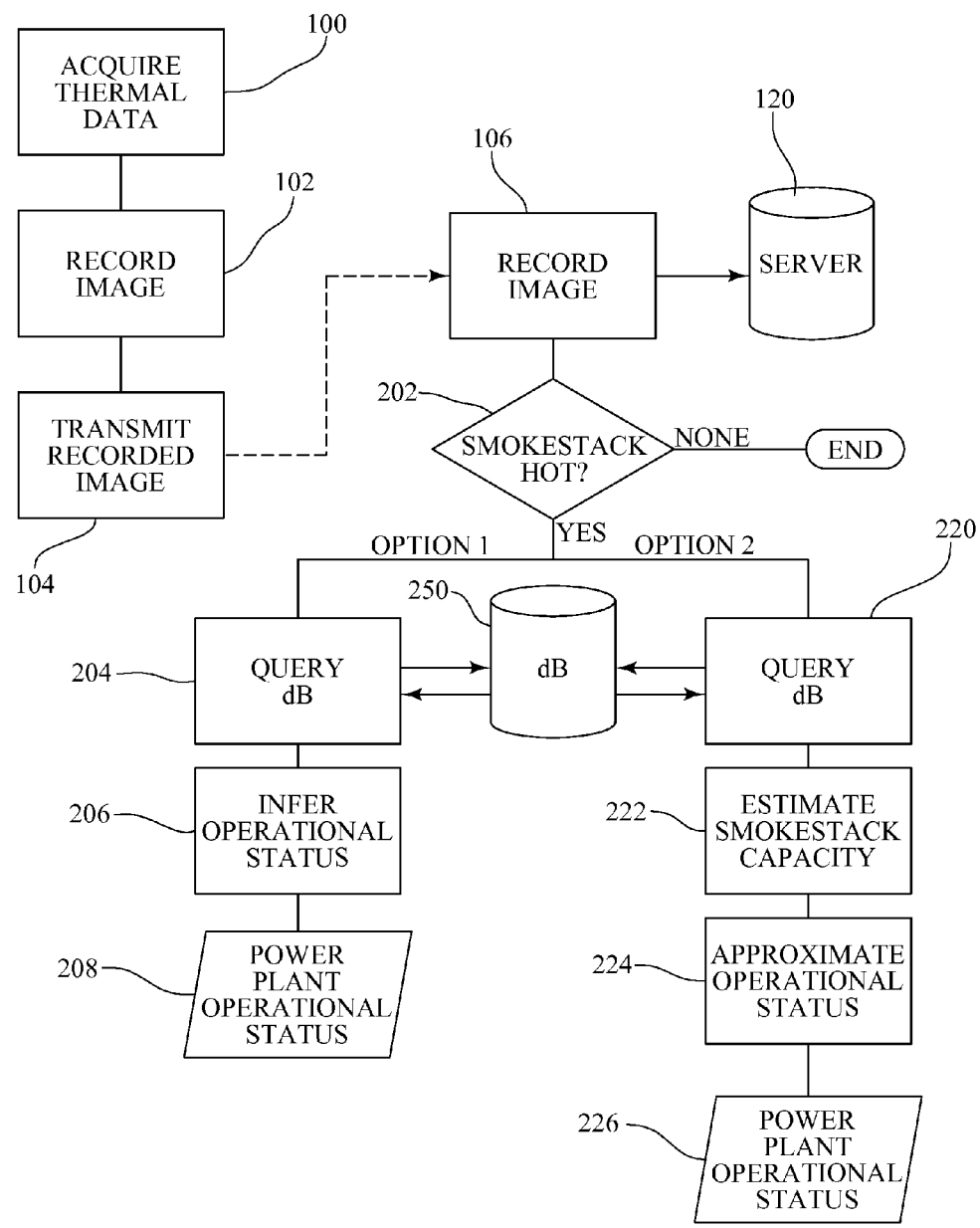
FIG. 2 is a flow chart illustrating an exemplary method in accordance with the present invention.

FIG. 2 is a flow chart illustrating an exemplary method for providing information to market participants about one or more power generating units based on thermal image data in accordance with the present invention. First, and as discussed above with respect to FIG. 1, the method commences with the acquisition of thermal data from a smokestack and/or the gas plume emitted from the smokestack of a power plant, as indicated by block 100 of FIG. 2. Then, one or more images of the acquired thermal data are recorded, as indicated by block 102 of FIG. 2. Recorded images are then transmitted, in substantially real-time or on a scheduled basis, to the central processing facility 40, as indicated by block 104 of FIG. 2. Finally, there is an analysis of the recorded images to draw an inference as to the operational status of the monitored power plant.

Specifically, with respect to such an analysis, once received at the central processing facility 40, the recorded images are stored on a server 120, as indicated by block 106 of FIG. 2. The analysis component 50 is in the form of a digital computer program, which is hosted by the server 120 or another computer connected to the server 120. Accordingly, the discrete steps of the analysis, which are described below, are preferably achieved through the use of a digital computer program, i.e., computer-readable instructions stored and executed by a computer. Such instructions can be coded into a computer-readable form using standard programming techniques and languages, and with benefit of the following description, such programming is readily accomplished by one of ordinary skill in the art.

Figure 3:
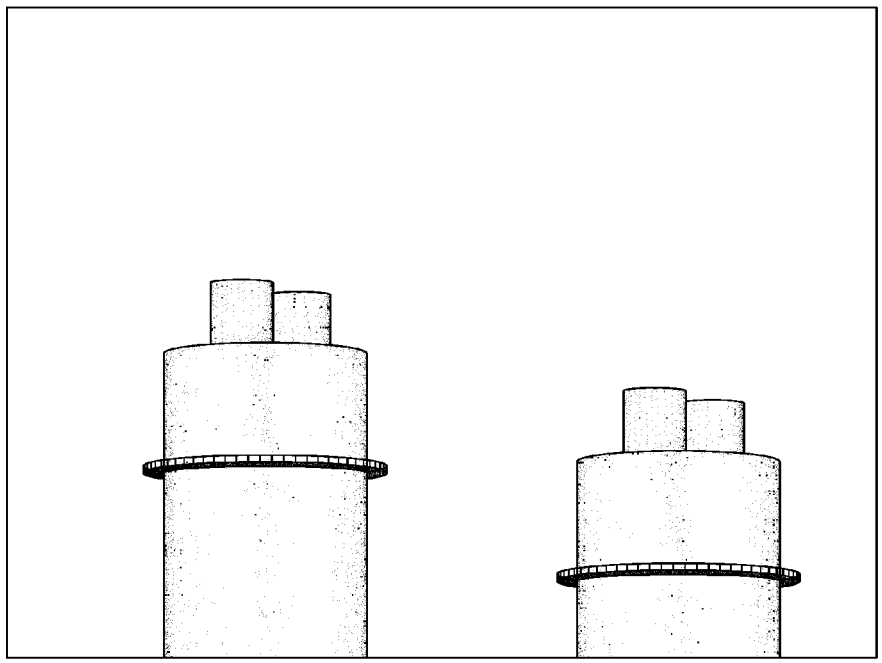
FIG. 3 is a representation of a set of power plant smokestacks captured by a conventional camera.
Figure 4:
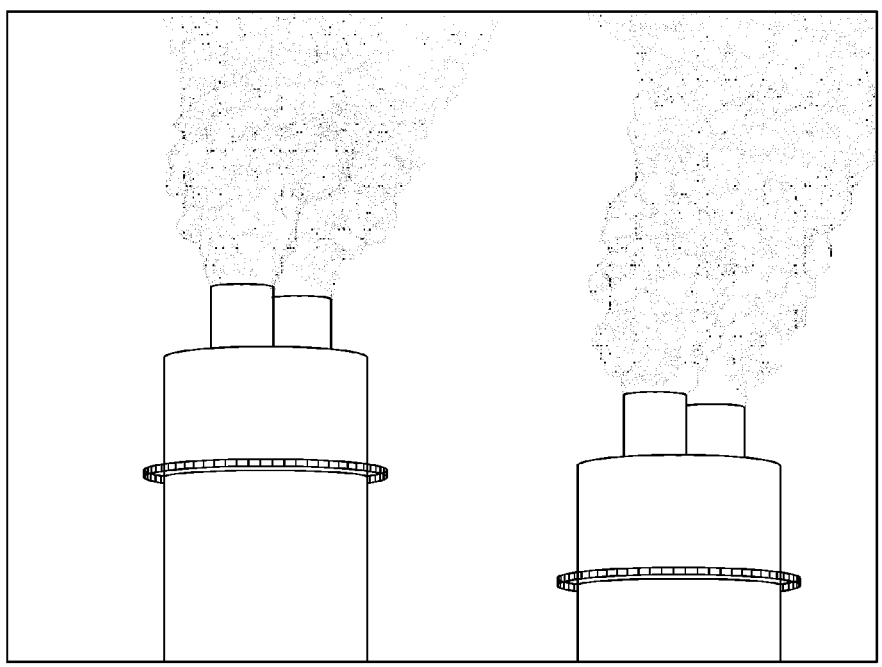
FIG. 4 is a representation of the set of power plant smokestacks of FIG. 3, but as captured in accordance with the present invention.

Referring still to FIG. 2, the analysis of a particular recorded image first requires a simple determination of whether each smokestack in the particular recorded image is "hot," i.e., whether the smokestack and/or the gas plume emitted from the smokestack is hotter than the ambient temperature of the air surrounding the smokestack, as indicated by decision 202. In the case of a monitor component 10 and video capture component 20 that generates grayscale images, a hotter area will be more white as compared to lower-temperature surrounding areas. For example, FIG. 3 is a representation of a set of power plant smokestacks captured by a conventional camera, while FIG. 4 is a representation of the same set of power plant smokestacks captured by a monitor component 10 and video capture component 20 in accordance with the present invention. In FIG. 4, respective gas plumes are visible with respect to all four smokestacks. Accordingly, with this information, it can be inferred that the power generating units associated with these four smokestacks are operational.

Once such a determination has been made as to how many smokestacks are "on" or "off" for a particular power plant, an inference can be drawn as to the amount of electricity then being generated and supplied by that power plant. In this regard, a database 250 of power generation data is queried to retrieve generation capacity data associated with a particular power plant, along with how many smokestacks are employed by that power plant, as indicated by block 204 of FIG. 2. For purposes of example, suppose that the database reports that a particular power plant has a 1600-MW power generating capacity and has four smokestacks, each smokestack being associated with a single 400-MW power generating unit, and then assume that the recorded images of these smokestacks indicate that three are "on." Accordingly, a simple multiplication of the estimate of current percentage of smokestacks that are "on" (¾=75%) times the power generating capacity (1600 MW) results in an inference as to the current operational status of the power plant, i.e., that the current power output of the power plant is no more than 1200 MW, as indication by block 206 and output 208 of FIG. 2.

Alternatively, in order to provide a more accurate assessment of the operational status of a particular power plant and the electricity then being generated and supplied by that power plant, once an initial determination has been made that one or more smokestacks are "on" or "off," a further approximation can be made as to operational status of an individual smokestack, and thus the operational status of a power generating unit associated with that smokestack. Specifically, the database 250 of power generation data is again queried to retrieve generation capacity data associated with a particular power plant and how the smokestacks are employed by that power plant, as indicated by block 220 of FIG. 2. Then, through an analysis of the recorded image of the smokestack, an estimate is made as to the current status, i.e., at what capacity is the smokestack operating, as indicated by block 222 of FIG. 2. Such an estimate may be based on the estimated temperature of the smokestack or based on a comparison to previously recorded images of the smokestack. With respect to basing such an estimate on a comparison to previously recorded images of the smokestack, parameters or characteristics that can be derived from the images to facilitate such a comparison, include, but are not limited to, image contrast, image intensity, and image signal-to-noise ratio.

Figure 5:
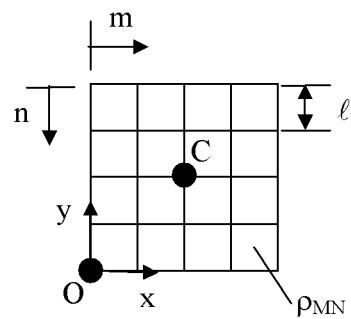
FIG. 5 illustrates how an image Region of Interest (ROI) consisting of a matrix of image pixels can be defined over relevant areas of a recorded image.

For example and referring now to FIG. 5, with respect to using image intensity to facilitate such a comparison and estimate of the current status of a smokestack, an image Region of Interest (ROI) consisting of a matrix of image pixels q (with M×N pixels) can be defined over relevant areas of a recorded image, such as the smokestack wall, the base of the gas plume, or the top of the gas plume.

Once the ROI is defined, the first step is to find the center of the ROI, $(x_c, y_c)$:

$$x_c = \frac{M \cdot \ell}{2} \quad (1)$$

$$y_c = \frac{N \cdot \ell}{2} \quad (2)$$

$$(x_c, y_c) = \left(\frac{M \cdot \ell}{2}, \frac{N \cdot \ell}{2}\right) \quad (3)$$

Now, we compute the distance, $r_{mn}$, from the center of any pixel to the center of the ROI, where the center of any pixel is $(x_{mn}, y_{mn})$. $r_{mn}$ then becomes the first weighting factor, a weighting factor based on distance from the center of the ROI.

$$x_{mn} = m \cdot \ell - \frac{\ell}{2} \quad (4)$$

$$y_{mn} = N \cdot \ell - \left(n \cdot \ell - \frac{\ell}{2}\right) \quad (5)$$

$$r_{mn} = \sqrt{(x_c - x_{mn})^2 + (y_c - y_{mn})^2} \quad (6)$$

We then determine the standard deviation of all of the pixel intensities in the ROI:

$$\sigma_q = \sqrt{\frac{\sum_{m=1}^{M} \sum_{n=1}^{N} (w_{mn} - \overline{w_{mn}})^2}{M \cdot N}} \quad (7)$$

Now, we find the absolute difference between any pixel deviation from the mean (i.e., a pixel standard deviation) and the standard deviation of all pixel intensities in the ROI to get the result, $s_{mn}$. $s_{mn}$ becomes the second weighting factor which represents pixel variation from the ROI as a whole.

$$s_{mn} = ||w_{mn} - \overline{w_{mn}}| - \sigma_q| \quad (8)$$

Finally, we can compute the representative ROI intensity, $w_q$, using the two sets of pixel weighting factors, $r_{mn}$ and $s_{mn}$.

$$w_q = \frac{\sum_{m=1}^{M} \sum_{n=1}^{N} w_{mn}(K_1 r_{max} - r_{mn})(K_2 s_{max} - s_{mn})}{\sum_{m=1}^{M} \sum_{n=1}^{N} (K_1 r_{max} - r_{mn})(K_2 s_{max} - s_{mn})} \quad (9)$$

where $$r_{max} = \sqrt{(x_{MN} - x_c)^2 + (y_{MN} - y_c)^2} \quad (10)$$

$$s_{max} = \max\{s_{mn}\} \quad (11)$$

and $K_1$ and $K_2$ are user-defined parameters that affect the overall scale of weighting.

Furthermore, sources of public power generation information may be used to develop or refine mathematical relationships between image-derived parameters or characteristics, such as ROI intensity, $w_q$, and the actual generation of a power generating unit associated with the smokestack.

In any event, and referring again to FIG. 2, by using such image processing techniques, an estimate is made as to the current status, i.e., at what capacity is the smokestack operating, as indicated by block 222 of FIG. 2. Using such an estimate and the power generation data retrieved from the database 250, an approximation of the current operational status of the power generating unit associated with that smokestack can be made, as indicated by block 224 and output 226 of FIG. 2. By aggregating such approximations with respect to each of the smokestacks of a particular power plant, an inference can be drawn as to the amount of electricity then being generated and supplied by that power plant. Also, once the current operational status has been determined for a particular power plant, this information can be aggregated with similar information from other power plants operating within a given regional electricity grid.

Finally, information about the operational status of one or more power generating units and/or power plants is communicated to third parties, i.e., market participants. It is contemplated and preferred that such communication to market participants be through export of the data to an access-controlled Internet web site, which end users can access through a common Internet browser program, such as Microsoft Internet Explorer®. Of course, communication of information and data to market participants may also be accomplished through a wide variety of other known communications media without departing from the spirit and scope of the present invention. Furthermore, it is important to recognize that the value of the information is affected by its currency, and therefore, it is contemplated that to the extent that the recorded images can be transmitted to the central processing facility in substantially real-time, information can then be communicated to market participants in substantially real-time.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for providing information to a market participant about a power generating unit, comprising the steps of:
   acquiring, by a thermal imaging camera, thermal data from one or more smokestacks associated with the power generating unit;
   recording an image of the acquired thermal data;
   transmitting the recorded image to a central processing facility;
   analyzing, by a computer, the recorded image by (a) defining a Region of Interest (ROI) consisting of a matrix of image pixels of a selected portion of the recorded image, (b) determining a center of the ROI, (c) computing a distance from a center of any pixel to the center of the ROI to establish a first weighting factor, (d) determining a standard deviation of all pixel intensities in the ROI, (e) computing an absolute difference between a pixel standard deviation and the standard deviation of all pixel intensities in the ROI to establish a second weighting factor, and (f) using the first weighting factor and the second weighting factor to compute a representative ROI intensity;
   using the computer to query a database of power generation data, retrieving data associated with the power generating unit from the database of power generation data, and then determining a current power output of the power generating unit based on the representative ROI intensity and the retrieved data; and
   communicating information about current power output of the power generating unit to the market participant.

2. The method as recited in claim 1, in which the thermal imaging camera is coupled to an optical arrangement for focusing on a selected smokestack of the one or more smokestacks.

3. The method as recited in claim 1, in which the recorded images are transmitted to the central processing facility in substantially real-time.

4. The method as recited in claim 1, in which communicating information about the current power output of the power generating unit to the market participant is accomplished through export of the information to an Internet web site accessible by the market participant.

* * * * *

UNITED STATES PATENT AND TRADEMARK OFFICE
CERTIFICATE OF CORRECTION

PATENT NO. : 8,972,273 B1  
APPLICATION NO. : 13/934950  
DATED : March 3, 2015  
INVENTOR(S) : Ramin Abrishamian and Gustav H. Beerel Page 1 of 1

It is certified that error appears in the above-identified patent and that said Letters Patent is hereby corrected as shown below:

On the title page item (72) Inventors, line 1: Correct the spelling of Abrishamain to Abrishamian Signed and Sealed this  
Seventh Day of July, 2015

Michelle K. Lee  
*Director of the United States Patent and Trademark Office*